(12) United States Patent
Vanderwater et al.

(10) Patent No.: US 10,152,549 B1
(45) Date of Patent: Dec. 11, 2018

(54) PROVIDING SUGGESTIONS TO A USER BASED ON SOCIAL ACTIVITY PATTERNS

(71) Applicant: Google Inc., Mountain View, CA (US)

(72) Inventors: Kathryn Rose Vanderwater, Plainfield, IL (US); Frances Bordwell Haugen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/452,664

(22) Filed: Mar. 7, 2017

Related U.S. Application Data

(63) Continuation of application No. 14/024,493, filed on Sep. 11, 2013, now Pat. No. 9,612,996.

(51) Int. Cl.
*G06F 15/16* (2006.01)
*G06F 17/30* (2006.01)

(52) U.S. Cl.
CPC .............. *G06F 17/30867* (2013.01)

(58) Field of Classification Search
CPC ........ G06F 17/30554; G06F 17/30867; G06Q 50/01
See application file for complete search history.

(56) References Cited

U.S. PATENT DOCUMENTS

| | | | | |
|---|---|---|---|---|
| 8,825,759 | B1 * | 9/2014 | Jackson | H04L 67/02 709/204 |
| 9,032,289 | B1 * | 5/2015 | Cierniak | G06F 17/3089 715/230 |
| 9,098,569 | B1 * | 8/2015 | Bhagat | G06F 17/30646 |
| 9,253,137 | B1 | 2/2016 | Jackson et al. | |
| 9,503,411 | B1 * | 11/2016 | Lin | G06F 17/3053 |
| 2007/0106659 | A1 * | 5/2007 | Lu | G06F 17/30554 |
| 2009/0006371 | A1 * | 1/2009 | Denoue | G06F 17/30867 |
| 2009/0319288 | A1 | 12/2009 | Slaney et al. | |
| 2010/0191742 | A1 * | 7/2010 | Stefik | G06F 17/30705 707/748 |
| 2010/0287588 | A1 * | 11/2010 | Cox | H04N 5/44543 725/40 |
| 2011/0191337 | A1 * | 8/2011 | Cort | G06F 3/048 707/728 |
| 2011/0307695 | A1 * | 12/2011 | Slater | G06F 17/30528 713/163 |
| 2012/0290661 | A1 | 11/2012 | Kersh | |

(Continued)

*Primary Examiner* — Jonathan A Bui
(74) *Attorney, Agent, or Firm* — McDermott Will & Emery LLP

(57) ABSTRACT

In one aspect, a method includes identifying one or more contacts associated with a user at one or more social networking services, identifying one or more social content items associated with the one or more contacts, generating one or more of candidate suggestions from the one or more social content items, the one or more candidate suggestions including n-grams generated from the one or more social content items, wherein each n-gram comprises a string of characters, ranking the one or more candidate suggestions according to one or more significance criteria and selecting one or more suggestions of the plurality of candidate suggestions according to the ranking. Other aspects can be embodied in corresponding systems and apparatus, including computer program products. These and other aspects can include one or more of the following features.

18 Claims, 4 Drawing Sheets

(56) References Cited

U.S. PATENT DOCUMENTS

| | | | |
|---|---|---|---|
| 2012/0315616 A1* | 12/2012 | Fourman | G09B 7/02 434/350 |
| 2013/0036171 A1 | 2/2013 | Gilbert | |
| 2013/0139048 A1* | 5/2013 | Dhawan | G06O 10/101 715/234 |
| 2014/0101193 A1* | 4/2014 | Dorohonceanu | G06F 17/30864 707/769 |
| 2014/0122584 A1* | 5/2014 | Gargi | G06O 50/01 709/204 |
| 2014/0164401 A1 | 6/2014 | Kyaw et al. | |
| 2014/0188926 A1 | 7/2014 | Chandel et al. | |
| 2014/0201229 A1* | 7/2014 | Kirazci | G06F 17/30643 707/767 |
| 2014/0207793 A1* | 7/2014 | Liu | G06F 17/30864 707/748 |
| 2014/0214822 A1* | 7/2014 | Sinha | G06F 17/3053 707/731 |
| 2014/0244622 A1* | 8/2014 | Lindsay | G06F 3/0237 707/722 |
| 2014/0283114 A1 | 9/2014 | Nastacio | |
| 2014/0337371 A1* | 11/2014 | Li | G06F 17/30958 707/767 |
| 2014/0365318 A1* | 12/2014 | Karande | G06Q 30/0275 705/14.71 |
| 2015/0058720 A1* | 2/2015 | Smadja | G06F 3/048 715/271 |
| 2015/0066949 A1* | 3/2015 | Harles | G06Q 50/01 707/748 |
| 2015/0074131 A1 | 3/2015 | Fernandez | |
| 2015/0127748 A1* | 5/2015 | Buryak | H04L 51/32 709/206 |
| 2015/0326538 A1* | 11/2015 | Keane | G06F 21/10 713/168 |

* cited by examiner

PROVIDING SUGGESTIONS TO A USER BASED ON SOCIAL ACTIVITY PATTERNS

CROSS-REFERENCE TO RELATED APPLICATION

The present application is a continuation of U.S. patent application Ser. No. 14/024,493, entitled "Providing Suggestions to a User Based on Social Activity Patterns," filed on Sep. 11, 2013 which is hereby incorporated by reference in its entirety for all purposes.

BACKGROUND

When a user is searching or browsing, one or more topic and/or search suggestions may be provided to the user in order to improve the users overall experience. These suggestions are typically based on search terms currently provided by the user or prior searches by the user, but they are often impersonal. Sites may, for example, algorithmically track trends, hot news, and related entities to offer a user interesting new content as suggestions. While these suggestions are useful, in the case of social networking services, where the service aims to build human relations, such suggestions may seem robotic and technical. For example, the suggestions fail to take into account the social data shared by users, when generating suggestions for the user.

SUMMARY

The disclosed subject matter relates to a computer-implemented method including identifying one or more contacts associated with a user at one or more social networking services. The method may further include identifying one or more social content items associated with the one or more contacts. The method may further include identifying one or more n-grams from the one or more social content items, each of the n-grams representing a term or phrase. The method may further include generating one or more of candidate suggestions based on the n-grams generated from the one or more social content items. The method may further include ranking the one or more candidate suggestions according to one or more significance criteria and selecting one or more suggestions of the one or more candidate suggestions according to the ranking. Other aspects can be embodied in corresponding systems and apparatus, including computer program products.

These and other aspects can include one or more of the following features. The significance criteria may include one or more of volume of activity and interactions associated with each of the plurality of candidate suggestion, the affinity of the user and the one or more contacts associated with each of the plurality of candidate suggestions, popularity of candidate suggestion, or relevance of candidate suggestion to user activity. The social content items may include social content items visible to the user according to access rights associated with the social content items.

The method may further include receiving an indication of a request to provide a user with one or more suggestions and providing the one or more suggestions for display to the user in response to the request. The method may further include determining one or more recommended social actions based on the one or more suggestions and providing the one or more recommended social actions for display to the user.

The ranking step may include assigning a score to the one or more candidate suggestions according to the one or more criteria and ranking the one or more candidate suggestions according to the score. The social content items may include content at one or more social networking services, where at least one of the one or more contacts has performed social activity with respect to the content. The social activity may include one or more of comment, endorsement, recommendation, tagging, share or posting in association with the content.

The method may further include identifying one or more contacts or groups of contacts associated with at least one suggestion of the one or more suggestions and providing the one or more contacts or groups of contacts for display along with the suggestion or social actions relating to the at least one suggestion.

The disclosed subject matter also relates to a system including one or more processors and a machine-readable medium including instructions stored therein, which when executed by the processors, cause the processors to perform operations including receiving an indication of a request to provide a user with one or more suggestion items. The operations may further include identifying one or more contacts associated with the user at one or more social networking services. The operations may further include identifying social activity and interaction data relating to the user and one or more contacts of the user. The operations may further include analyzing the social activity and interaction data. The operations may further include generating a plurality of n-grams in response to the analysis, each n-gram including a string of characters. The operations may further include providing one or more suggestions for display to the user in response to the request based on one or more n-grams of the plurality of n-grams. Other aspects can be embodied in corresponding systems and apparatus, including computer program products.

These and other aspects can include one or more of the following features. The operations may further include ranking the plurality of n-grams according to one or more criteria and selecting the one or more n-grams based on the ranking.

The significance criteria may include one or more of volume of activity and interactions associated with each of the plurality of n-grams, the affinity of the user and the one or more contacts associated with each of the plurality of n-grams, popularity of n-grams, or relevance of the n-grams to user activity. The social activity and interaction data may include social content items visible to the user according to access rights associated with the social contact items. The one or more suggestions may include at least one of the one or more n-grams. The one or more suggestions may include recommended actions determined based on at least one of the one or more n-grams.

The operations may further include assigning a score to the one or more n-grams according to one or more criteria. The activity and interaction data may include content at one or more social networking services, where at least one of the one or more contacts has performed social activity with respect to the content, and where the social activity includes one or more of comment, endorsement, recommendation, tagging, share or posting in association with the content.

The method may further include identifying one or more contacts or groups of contacts associated with at least one of the one or more n-grams based as contacts and groups of contacts associated with the activity and interaction data that the n-gram appears in and providing the one or more contacts or groups of contacts for display along with the suggestion or social actions relating to the n-grams for display to the user.

The disclosed subject matter also relates to a machine-readable medium including instructions stored therein, which when executed by a machine, cause the machine to perform operations including receiving an indication of a request to provide a user with one or more suggestions. The operations may further include identifying one or more social content items associated with the one or more contacts associated with the user at one or more social networking services. The operations may further include generating one or more n-grams from the one or more social content items. The operations may further include ranking the one or more n-grams according to one or more significance criteria. The operations may further include determining one or more suggestions from the one or more n-grams according to the ranking and providing the one or more suggestions for display to the user in response to the request. Other aspects can be embodied in corresponding systems and apparatus, including computer program products.

These and other aspects can include one or more of the following features. The operations may further include determining one or more recommended social actions based on the one or more suggestions and providing the one or more recommended social actions for display to the user.

These and other features of the invention described throughout the application provide one or more advantages, including but not limited to, providing users with suggestions based on social interactions and actions by the user and/or the social networking contacts of the user. These suggestions are based on social interactions and thus provide more personalized suggestions to the user that are beneficial for building relationships and performed social activity.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
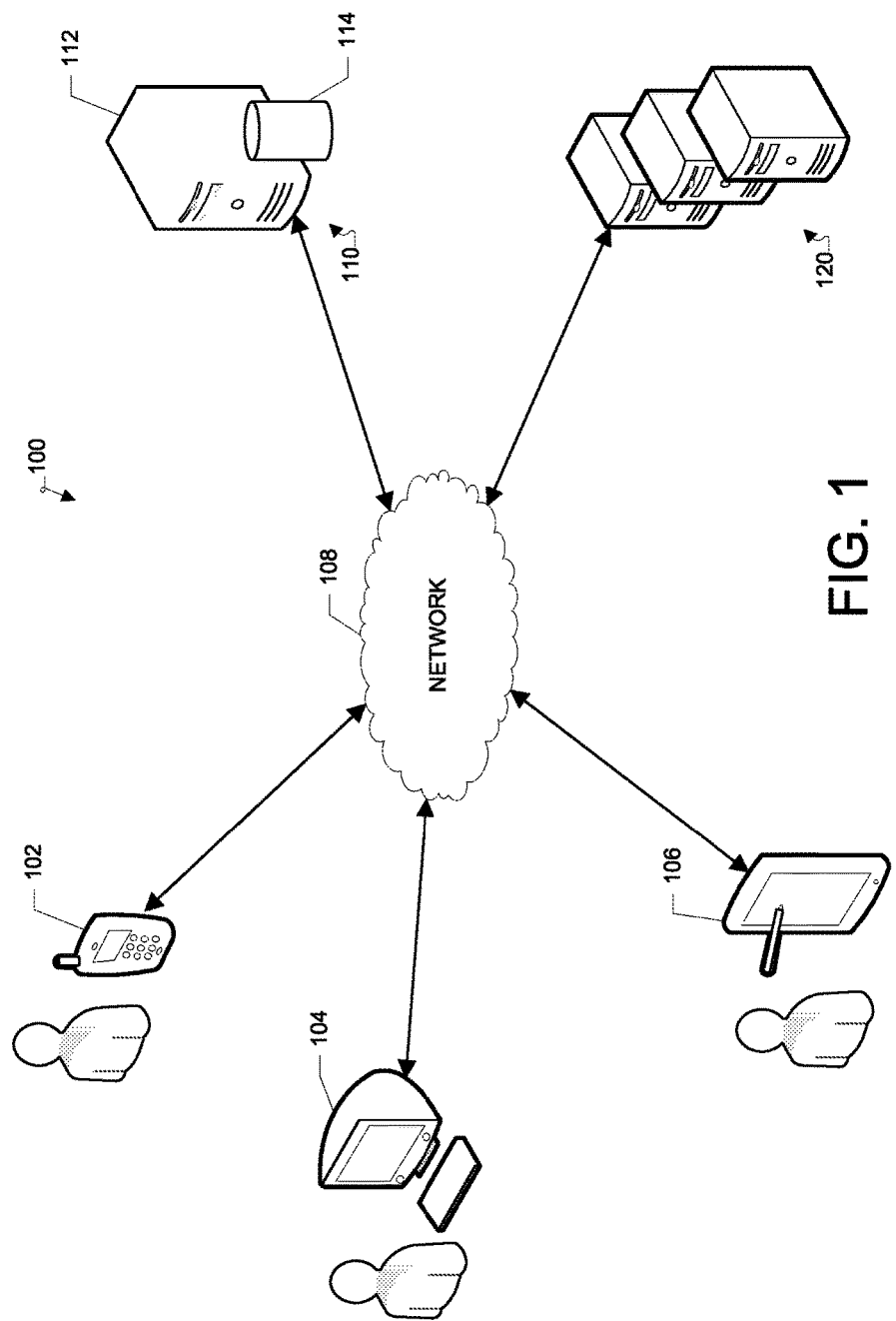
FIG. 1 illustrates an example client-server network environment, which facilitates providing a user with suggestions based on social interactions.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The subject disclosure facilitates providing users with suggestions based on social interactions and actions by the user and/or the social networking contacts of the user. Social interactions and actions performed by users of one or more social networking services (e.g., user and/or contacts of the user) are received and analyzed to provide one or more suggestions to a user according to those actions and interactions.

The suggestions are provided by analyzing time series data regarding user social activity and interactions among various groups of users (e.g., contacts or social groups associated with a user). In one example, the social activity and interactions of contacts and social groups of the user are analyzed. The contacts of the user are identified and social data including the social actions and interactions by the identified contacts and/or visible to the user are retrieved. The social data are analyzed to generate n-grams (e.g., 5-grams) according to the analysis of the social data. In one example, the term "n-gram" as used herein refers to a sequence or model made up of n items or characters from a given sequence of text or speech, and/or the probabilistic language model for predicting the next item in such a sequence. The generated n-grams may be filtered according to various criteria including, for example, filtering unsuitable content.

The n-grams are next sorted according to various significance criteria indicating the significance of an n-gram. The significance criteria, may, for example, include, the volume of social activity associated with an n-gram (e.g., number of posts, number of shares, number of tags, number of comments, number of endorsements, etc.). In addition, the significance criteria may include affinity of the user and contacts associated with the n-gram (e.g., n-gram source(s)), popularity of words used in the n-gram (e.g., the TFIDF significance model), or other ranking or significance criteria.

The system may select one or more n-grams ranked as the most significant (e.g., n-grams having the highest significance score) n-grams for providing to the user. The ranking may be based on various criteria indicating the relevance of the n-gram to the user. In one example, the social relationships of the user are taken into account when ranking the n-grams. In one example, the n-grams are presented as a string of characters as suggestions to a user within the social networking profile of the user. In another example, the n-gram strings are presented as search suggestions or autocomplete suggestions to the user. In one example, messages or notifications may be provided for display to the user including the n-grams. In one example, one or more suggested actions may be determined based on the n-grams and may be provided for display to the user.

Users of social networking services may create associations with one another. The phrase "social networking service" as used herein encompasses its plain and ordinary meaning, including, but not limited to, an online service, platform or site that focuses on building and reflecting of social associations among users and/or facilitating social interaction among users. Social networking services may include a service that facilitates the building of social networks or social relations among people who, for example, share interests, activities, backgrounds, or real-life connections. Example social networking services may include collaborative projects, blogs and microblogs, content communities, social networking sites, virtual game worlds, virtual social worlds or any other service that supports technologies and services including blogs, picture-sharing, vlogs, wall-postings, email, instant messaging, music-sharing, crowd sourcing and voice over IP and/or social media such as magazines, Internet forums, weblogs, social blogs, microblogging, wikis, social networks, podcasts, photographs or pictures, video, rating and social bookmarking.

User associations may be stored within a social graph at each social networking service (e.g., maintained at remote server(s) 120). Such user associations may be defined on a user-to-user basis, or as a group of users associated through membership within a group. As used herein, "contacts" refer to other users that a user is associated with, at one or more social networking services.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

FIG. 1 illustrates an example client-server network environment, which facilitates providing a user with suggestions based on social interactions. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate providing a user interacting with an electronic device 102, 104 or 106 with suggestions based on social interactions of one or more users interacting with electronic devices 102, 104 and/or 106. Server 110 may further be in communication with remote servers 120 either through the network 108 or through another network or communication means.

In one example, the network environment may include one or more remote servers 120 performing various functionalities and/or storage capabilities described herein with regard to the server 110 either alone or in combination with server 110. Server 110 may further maintain or be in communication with social networking services hosted on one or more remote server 120. The one or more social networking services may provide various services and may enable users to create a profile and associate themselves with other users at a remote social networking service. The server 110 and/or the one or more remote servers 120 may further facilitate the generation and maintenance of a social graph including the user created associations. The social graphs may include, for example, a list of all users of the remote social networking service and their associations with other users of a remote social networking service. The social networking services may further facilitate user interactions and various social activities.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system hosted by server 110, and/or one or more social networking services hosted by remote servers 120, through a client application installed at the electronic devices 102, 104, 106. Alternatively, the user may interact with the system and the one or more social networking services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet. and the like. Further, the network 108 can include, but is not limited to, any one or more of the following network topologies, including a bus network, a star network, a ring network, a mesh network, a star-bus network, tree or hierarchical network, and the like.

Figure 2:
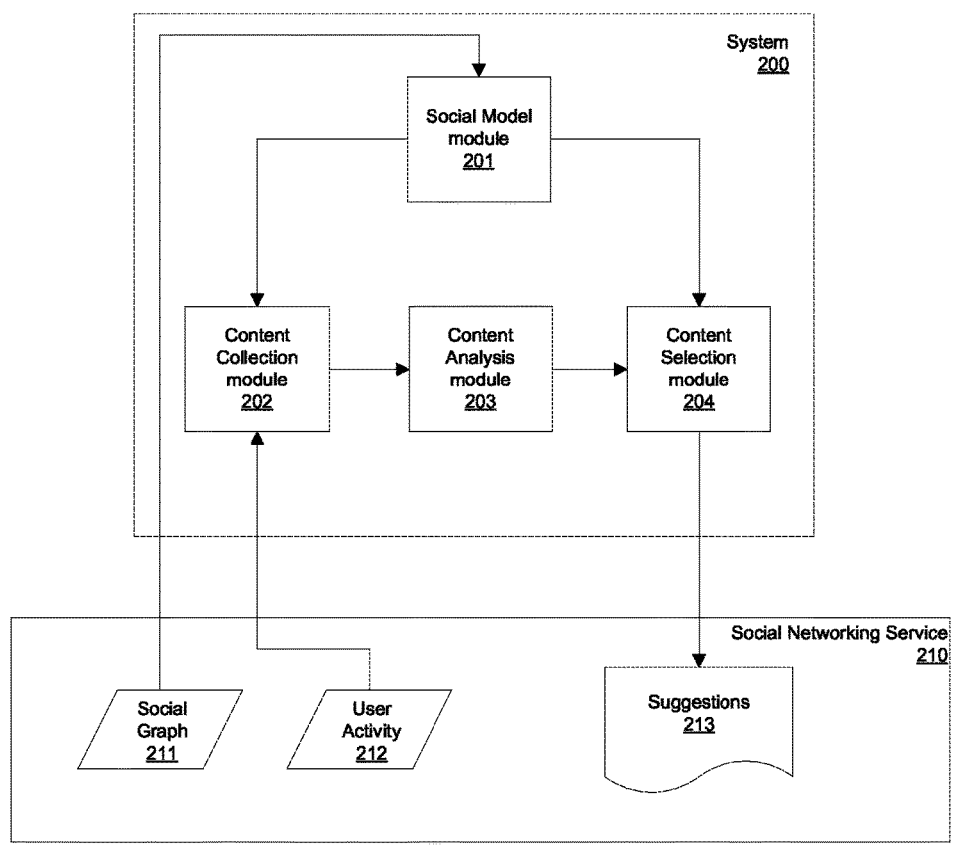
FIG. 2 illustrates a block diagram of an example system for providing a user with suggestions based on social interactions.

FIG. 2 illustrates a block diagram of an example system 200 for providing a user with suggestions based on social interactions. System 200 (e.g., hosted at server 110) includes a social model module 201, a content collection module 202, a content analysis module 203 and a content selection module 204.

System 200 is communicatively coupled to at least one social networking service 210 (e.g., over network 108), and may receive social graph information 211 and user activity data 212 from the social networking service 210. System 200 is further configured to send suggestions 213 to the social networking service 210 for display to one or more users of the social networking service.

Social model module 201 is configured to determine one or more connections for a user at one or more social networking services, for example, according to social graph information 211. In one example, social model module 201 is configured to determine a level of affinity for one or more contacts of a user. In one example, affinity information may indicate the degree of connection between a user and one or more contacts or groups of contacts. In one example, the social model module 201 may determine the affinity information based on social graph information 211 and/or user activity data 212 received from the social networking service 210. In another example, the social networking service 210 may have data regarding the social affinity of users of the social networking activity, and the social model module 201 may be configured to query the social networking service 210 for affinity information for a user and one or more contacts of the user.

Content collection module 202 is communicatively coupled to the social model 201 and is configured to collect social content associated with the one or more contacts of a user. The social content may include posts and other content associated with the one or more contacts at the social networking service. In one example, the posts and other content may include any content with respect to which a user or contact of a user has performed one or more social activities. Social activities may include any activity by a user at a social networking service or in association with the social networking service or other actions having social significance. Example social activities include posts, comments, endorsements, shares, recommendations, and other similar actions facilitated by a social networking service or having social or interactive characteristics.

In one example, social activity data 212 associated with social activities of one or more users of one or more social networking services, including social networking service 210, may be received at the content collection module 202. The content collection module may identify social content associated with one or more contacts of the user as identified by the social model module 201. In another example, the content collection module 202 may be configured to receive identifiers for one or more contacts of the user from the social model module 201 and may query the social networking service 210 for user activity data 212 associated with the contact information. In one example, content collection module 202 may be configured to select content according to one or more social connection factors received from the social module model module 201, including for example, data regarding one or more contacts and affinity of the one or more contacts with the user.

Content analysis module 203 is communicatively coupled to the content collection module 202 and is configured to receive social content selected by the content collection module 202 and to analyze the social content to provide one or more candidate terms or phrases. In one example, the content analysis module 203 is configured to generate one or more n-grams (e.g., 4-grams or 5-grams) from the social content received from the content collection module 203. An n-gram may represent a term or phrase appearing within the content associated with the user and/or one or more contacts of the user. N-grams of the social content may be generated as sequences of characters or words within the social content. The content may be parsed and n-grams (e.g., 4-grams or 5-grams) of the content may be generated.

The content selection module 204 is communicatively coupled to the content analysis module 203 and is configured to receive the one or more candidate terms or phrases (e.g., n-grams) and select one or more of the candidate terms or phrases for generating suggestions to be provided to a user. In one example, the content selection module 204 is communicatively coupled to the social model module 201 and is configured to receive social connection and/or affinity information from the social model module 201 for scoring and/or ranking the terms and/or phrases received from the content selection module and/or for providing one or more suggestions to the social networking service 210.

In one example, the candidate terms or phrases (n-grams) are sorted and filtered to find patterns. That is, the n-grams are sorted to determine significant terms or phrases according to different sorting/filtering criteria. The n-grams ("terms or phrases") may be scored according to quality criteria and those n-grams with the best scores (e.g., highest scores or scores meeting pre-defined criteria) may be selected as suggestions. That is, n-grams which appear to be of most quality or significance are identified and presented to the user. An n-gram model is a type of probabilistic language model for predicting the next item in such a sequence. In one example, an n-gram model assess the probability of a given word sequence appearing in text of a language of interest in pattern recognition systems. N-grams of the social content can be used to find patterns in the social content and/or identify terms or phrases that appear across social content. The n-grams may for example provide insight into the most likely terms to appear after one another or within the body of various content (e.g., posts), thus providing terms or phrases that are likely to be of significance to a social networking user.

In one example, the content selection module 204 is configured to calculate a score to each of one or more candidate terms or phrases received from the content selection module based on one or more criteria. In one example, the content selection module 204 is configured to rank the one or more terms or phrases (e.g., based on the score assigned to terms or phrases). In one example, the content selection module is configured to select one or more of the candidate search and phrases based on various factors and/or criteria, including for example, a score and/or ranking associated with the terms or phrases.

The criteria for calculating a score, ranking and/or selection of a candidate search term or phrase may include the overall popularity of the term or phrase (e.g., for all content at the social networking service and/or specifically with respect to the user and one or more contacts of the user), the volume of social activity performed with respect to content items associated with the terms or phrases, one or more users associated with the terms or phrases, social affinity of the user with respect to the one or more users associated with the terms or phrases, level of interest of the user in the terms or phrases (e.g., based on activity of the user with respect to content relating to the terms or phrases), level of interest of one or more contacts of the user in the search terms or phrases, and other similar criteria indicating the significance of the term or phrase.

Content selection module 204 may be communicationally coupled to the social networking service 210 and may provide the social networking service with one or more suggestions 213 based on the one or more selected terms or phrases (e.g., one or more of the candidate search terms and phrases).

While the system 200 is displayed as being a separate entity from the social networking service 210, it should be understood by one of ordinary skill in the art that system 200 may be implemented as a component the social networking service 210. Additionally, while system 200 is shown as being communicationally coupled to and receiving information from and/or providing suggestions to a single social networking service 210, any number of social networking services may be communicationally coupled to system 200, and may provide the system 200 with social information including social graph information 211 and social activity data 212. Furthermore, system 200 may provide recommendations to any number of social networking services and/or other applications (e.g., a search engine, email application, advertising application, etc.). In one example system 200 may receive data from one or more other applications, where the data is related to user activity and/or interaction with respect to one or more other users, and wherein the data is useful in generating social connection information and/or suggestions for the user.

Various functionalities described with respect to a module or component of the system 200 or social networking service 210 may be performed at or in collaboration with one or more other modules or components of the system 200 or social networking service 210 or one or more other systems or services.

Figure 3:
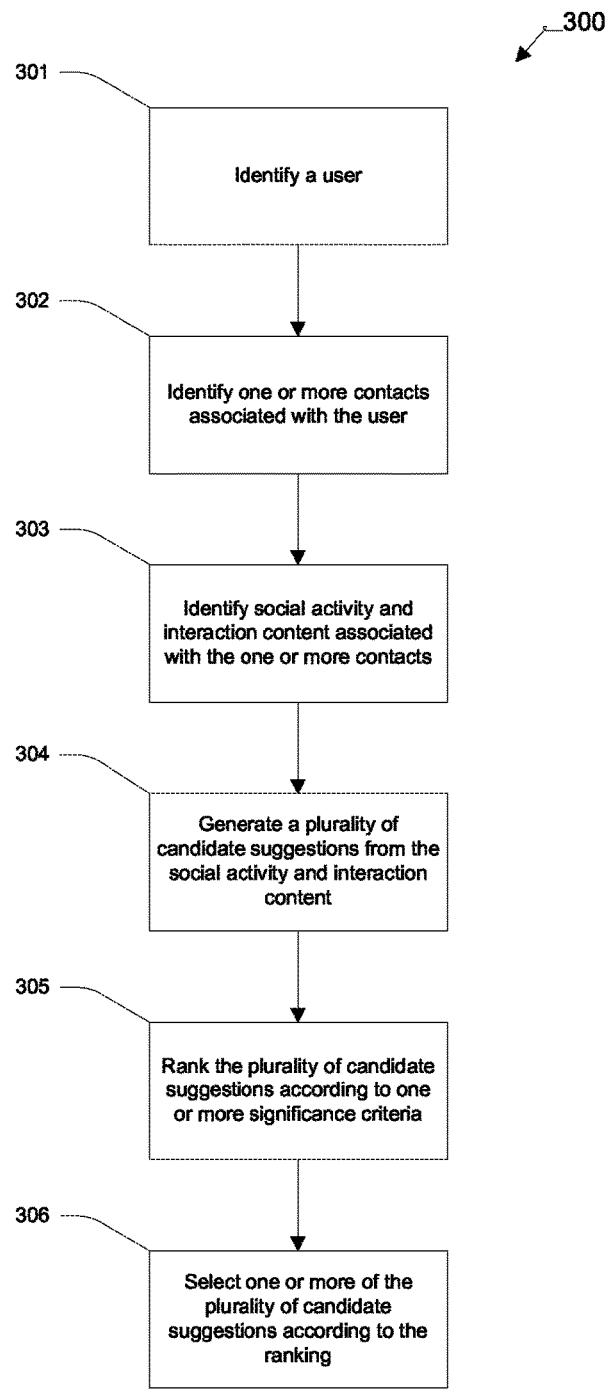
FIG. 3 illustrates a flow diagram of an example process for providing a user with suggestions based on social interactions.

FIG. 3 illustrates a flow diagram of an example process 300 for providing a user with suggestions based on social interactions. In step 301, a user is identified. In one example, the user at a social networking service. In one example, the user is identified in response to an indication that one or more suggestions should be provided to the user.

In step 302, one or more contacts associated with the user are identified. In one example, social graph information from one or more social networking services, and/or other data indicating social interaction or connection between the user and one or more users may be used to identify one or more contacts associated with the user at one or more social networking services.

In step 303, one or more social activity and interaction content items associated with the one or more contacts is identified. In one example, the social activity and interaction content includes content that the user and/or the one or more contacts interacted with at one or more social networking services or other applications. In one example, the content items may include posts with respect to which the one or more contacts performed one or more social activity. The one or more social activity may include posts, comments, endorsements, recommendations, shares, tags, and other activity facilitated at one or more social networking services with respect to content. In one example, the social activity and interaction content items identified in step 303 may include those items that are visible to the user (e.g., according to access rights associated with the content items).

In step 304, one or more candidate suggestions are identified based on the social activity and interaction content items identified in step 303. The candidate suggestions may include terms or phrases. In one example, the candidate suggestions are n-grams generated from the social activity interaction content items.

In step 305, the one or more candidate suggestions are ranked according to one or more significance criteria. In one example, a score may be assigned to one or more candidate suggestions and the candidate suggestions may be ranked according to the score. In one example, the score may indicate the social significance of the candidate suggestion (e.g., n-gram).

Criteria for ranking and/or assigning a score to candidate suggestions may include any indicators of social significance or relevance of a candidate suggestion to a user. Such criteria may, for example, include popularity of the candidate suggestion (e.g., for all content at the social networking service and/or specifically with respect to the user and one or more contacts of the user), volume of social activity performed with respect to content items associated with the candidate suggestion, one or more users associated with the candidate suggestions, social affinity of the user with respect to the one or more users associated with the candidate suggestions, level of interest of the user in the candidate suggestions (e.g., based on activity of the user with respect to content relating to the terms or phrases), level of interest of one or more contacts of the user in the candidate suggestion, relevance of the candidate suggestion to user activity (e.g., user search query or other activity), and other similar criteria indicating the significance of the candidate suggestion.

In step 306, one or more of the candidate suggestions are selected according to the ranking. The selected candidate suggestions may be provided for display to the user. In one example, the selected suggestions may be provided to the user as suggested topics, search terms and/or other recommendations. In one example, one or more activity may be determined according to the selected suggestions, and the one or more activity may be recommended to the user. In one example, the activity may comprise social activity recommended to the user in view of the candidate suggestion being selected as a significant suggestion for the user.

In one example, candidate suggestions may be associated with a specific user or groups of users (e.g., contacts or contact groups). In such examples, the suggestions may be displayed with indicators that the suggestions are related to specific contacts and/or groups of contacts. In one example, one or more actions may be suggested in connection to one or more contacts or contact groups based on suggestions related to the contact or contact groups.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
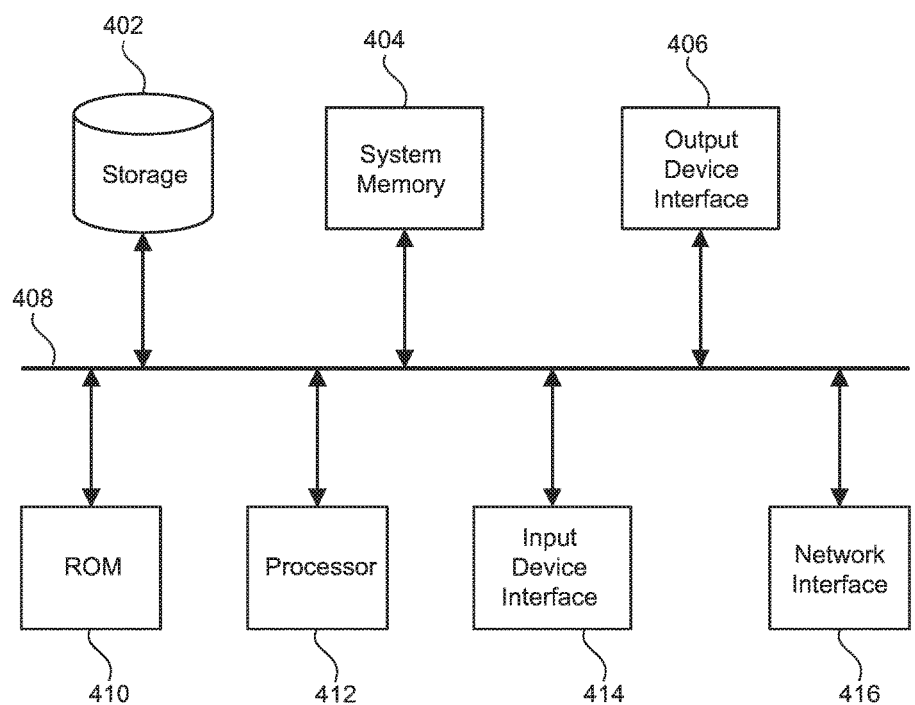
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for providing a user with suggestions based on social activity and interactions according to various embodiments. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touch-screen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM. DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server". "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback. e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component. e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be used together. Features under one heading may be combined with features under one or more other heading and all features under one heading need not be used together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method comprising:
    selecting a plurality of n-grams from one or more social content items, each of the n-grams representing a plurality of terms from the one or more social content items, the social content items comprising content corresponding to activity performed by at least one user within a social networking service;
    assigning a score to each of the plurality of n-grams based on one or more significance criteria;
    generating one or more candidate suggestions from the plurality of n-grams based on the score of each of the plurality of n-grams, the one or more candidate suggestions including recommended actions to perform within the social networking service;

identifying one or more contacts or groups of contacts associated with at least one of the one or more candidate suggestions; and providing the one or more contacts or groups of contacts for display, by the social network service, along with the at least one of the one or more candidate suggestions to facilitate additional user activity within the social networking service.

2. The method of claim 1, further comprising:

receiving an indication of a request to provide a user with one or more suggestions; and identifying the one or more social content items based on one or more contacts of the user.

3. The method of claim 2, wherein the one or more significance criteria includes one or more of popularity of the n-grams, volume of social activity performed with respect to the one or more social content items, a social affinity of the user and the one or more contacts, a level of interest of the user in content items relating to the n-grams, or relevance of the n-grams to user activity.

4. The method of claim 3, wherein the popularity of the n-grams is with respect to the user and the one or more contacts.

5. The method of claim 3, wherein the level of interest is based on activity of the user with respect to content items relating to the n-grams.

6. The method of claim 2, wherein the social content items includes social content items visible to the user according to access rights associated with the social content items.

7. The method of claim 2, wherein at least one of the one or more contacts has performed social activity with respect to the one or more social content items.

8. The method of claim 7, wherein the social activity comprises one or more of comment, endorsement, recommendation, tagging, share or posting in association with the content.

9. The method of claim 1, further comprising:

providing the one or more candidate suggestions for display as suggested topics.

10. The method of claim 1, further comprising:

determining one or more recommended social actions based on the one or more candidate suggestions; and providing the one or more recommended social actions for display.

11. The method of claim 1, wherein selecting the plurality of n-grams comprises:

analyzing the one or more social content items by applying n-gram modeling to determine terms or phrases that are likely to be significant within the one or more social content items.

12. A system comprising:

one or more processors; and a machine-readable medium comprising instructions stored therein, which when executed by the processors, cause the processors to perform operations comprising:

receiving an indication of a request to provide a user with one or more suggestion items;

identifying social activity and interaction data relating to the user and one or more contacts of the user at a social networking service, wherein the social activity and interaction data includes content corresponding to activity performed by at least one of the one or more contacts of the user within the social networking service;

analyzing the social activity and interaction data;

selecting a plurality of n-grams in response to the analyzing, each n-gram comprising a string of characters related to a plurality of terms;

assigning a score to each of the plurality of n-grams based on one or more significance criteria;

generating one or more candidate suggestions from the plurality of n-grams based on the score of each of the plurality of n-grams, the one or more candidate suggestions including recommended actions to perform within the social networking service;

identifying one or more contacts or groups of contacts associated with at least one particular n-gram of the plurality of n-grams based on contacts and groups of contacts associated with the social activity and interaction data that the at least one particular n-gram appears in; and providing the one or more contacts or groups of contacts for display, by the social network service, along with a particular candidate suggestion relating to the at least one particular n-gram of the plurality of n-grams to facilitate additional user activity within the social networking service.

13. The system of claim 12, wherein the one or more significance criteria includes one or more of popularity of the n-grams, volume of social activity performed with respect to one or more social content items, a social affinity of the user and the one or more contacts, a level of interest of the user in content items relating to the n-grams, or relevance of the n-grams to user activity.

14. The system of claim 12, wherein the one or more candidate suggestions include recommended actions determined based on at least one of the plurality of n-grams.

15. The system of claim 12, wherein the social activity and interaction data include social content items visible to the user according to access rights associated with social contact items, wherein at least one of the one or more contacts has performed social activity with respect to content, and wherein the social activity comprises one or more of comment, endorsement, recommendation, tagging, share or posting in association with the content.

16. A machine-readable medium comprising instructions stored therein, which when executed by a machine, cause the machine to perform operations comprising:

receiving an indication of a request to provide a user with one or more suggestions;

identifying one or more social content items;

selecting a plurality of n-grams from the one or more social content items, each of the n-grams representing a plurality of terms from the one or more social content items, the social content items comprising content corresponding to activity performed by at least one user within a social networking service;

assigning a score to each of the plurality of n-grams based on one or more significance criteria;

generating one or more candidate suggestions from the n-grams based on the score of each of the plurality of n-grams, the one or more candidate suggestions including recommended actions to perform within the social networking service;

identifying one or more contacts or groups of contacts associated with at least one of the one or more candidate suggestions; and providing the one or more contacts or groups of contacts for display by the social network service, along with the at least one of the one or more candidate suggestions to facilitate additional user activity within the social networking service.

17. The machine-readable medium of claim 16, wherein selecting the plurality of n-grams comprises:
 analyzing the one or more social content items by applying n-gram modeling to determine terms or phrases that are likely to be significant within the one or more social content items.

18. The machine-readable medium of claim 16, wherein the one or more significance criteria includes one or more of popularity of the n-grams, volume of social activity performed with respect to the one or more social content items, a social affinity of the user and one or more contacts associated with the one or more social content items, a level of interest of the user in content items relating to the n-grams, or relevance of the n-grams to user activity.

\* \* \* \* \*